July 8, 1924.
E. A. GODLEY ET AL
MEANS FOR MEASURING LUMBER
Filed Sept. 23, 1921    6 Sheets-Sheet 1
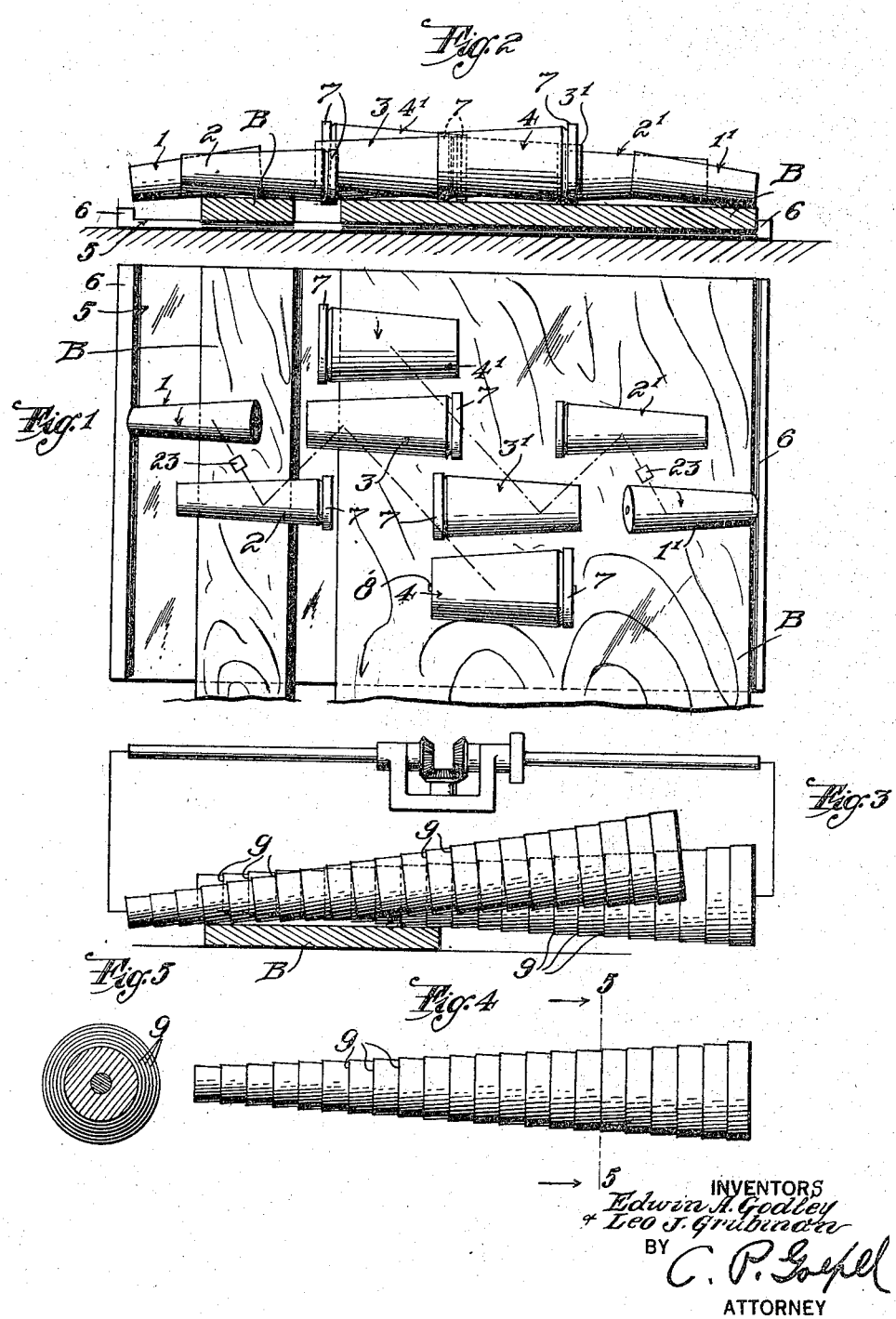
INVENTORS
Edwin A. Godley
& Leo J. Grubinon
BY
C. P. Goepel
ATTORNEY July 8, 1924.

E. A. GODLEY ET AL 1,500,447

MEANS FOR MEASURING LUMBER

Filed Sept. 23, 1921    6 Sheets-Sheet 2

Fig. 6

INVENTORS
Edwin A. Godley
Leo J. Grubman
BY
C. P. Goepel
ATTORNEY

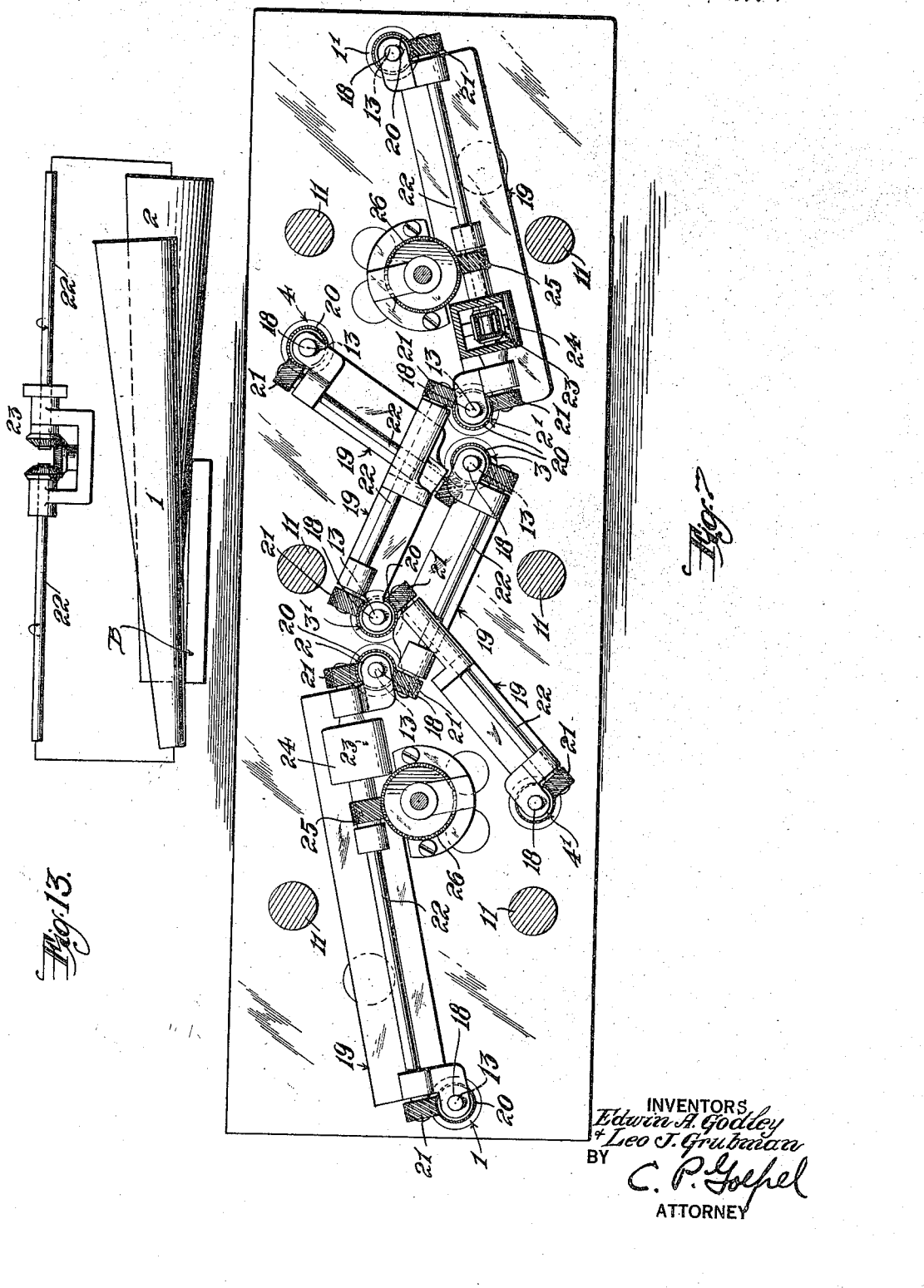

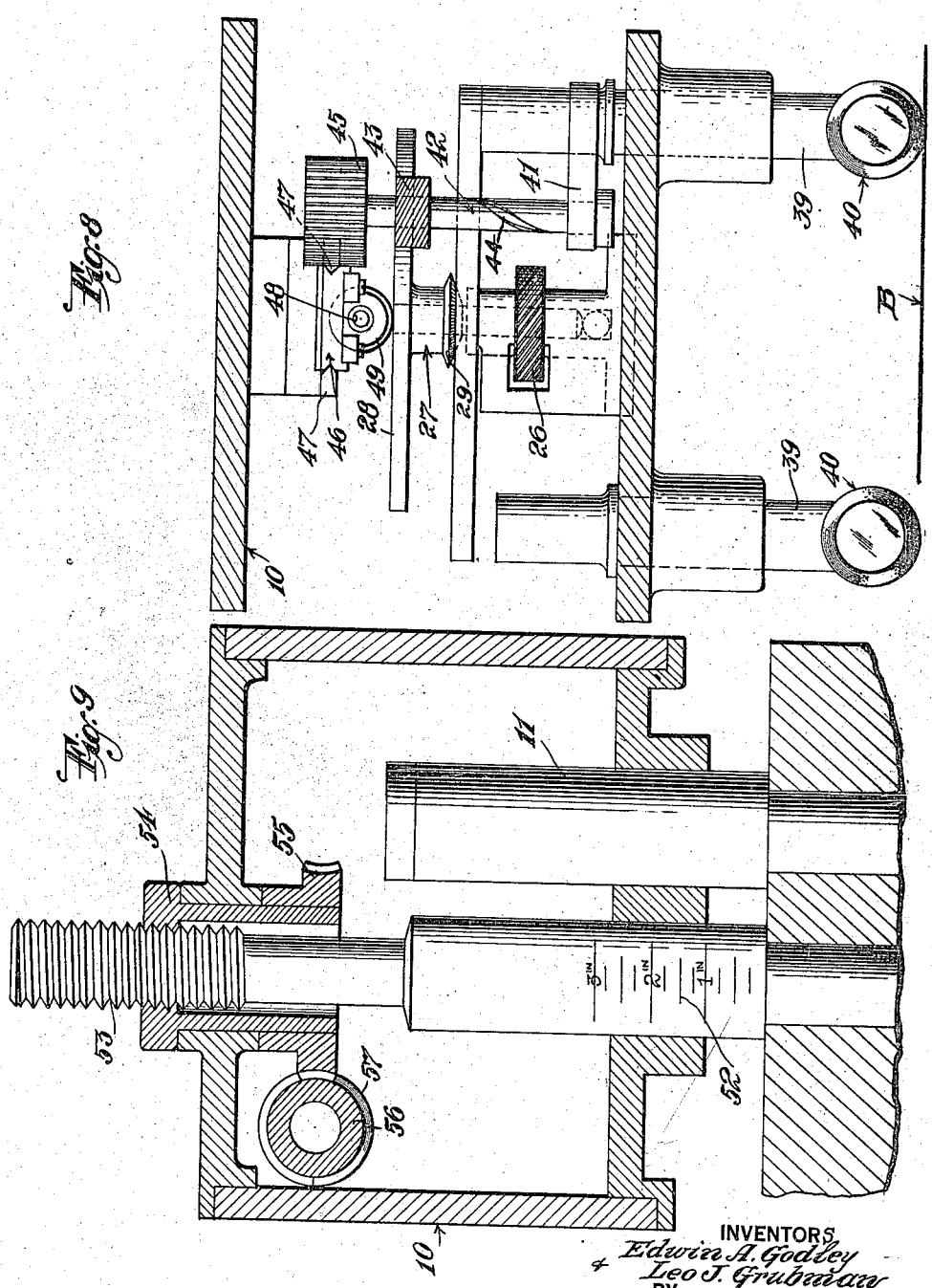

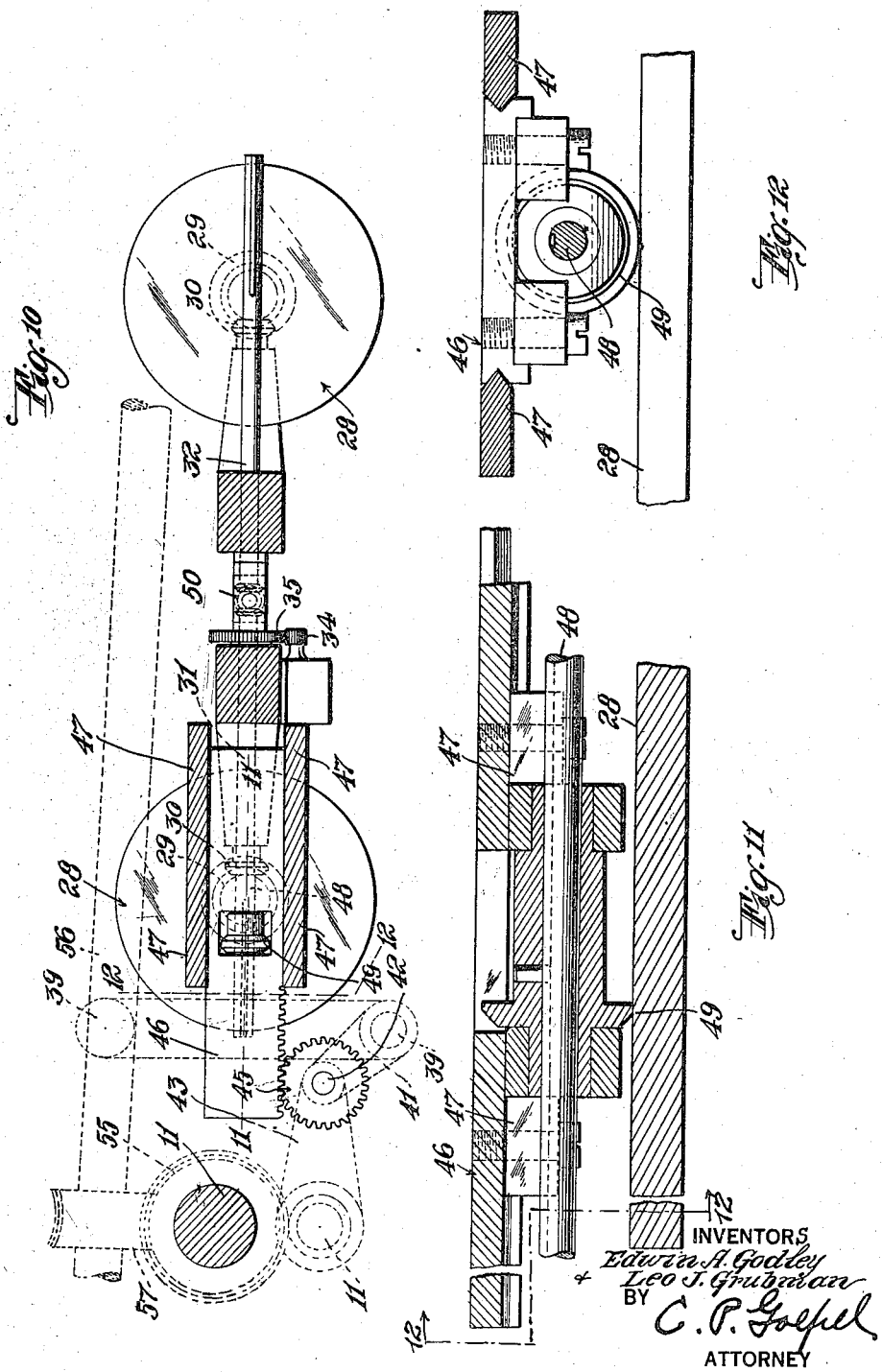

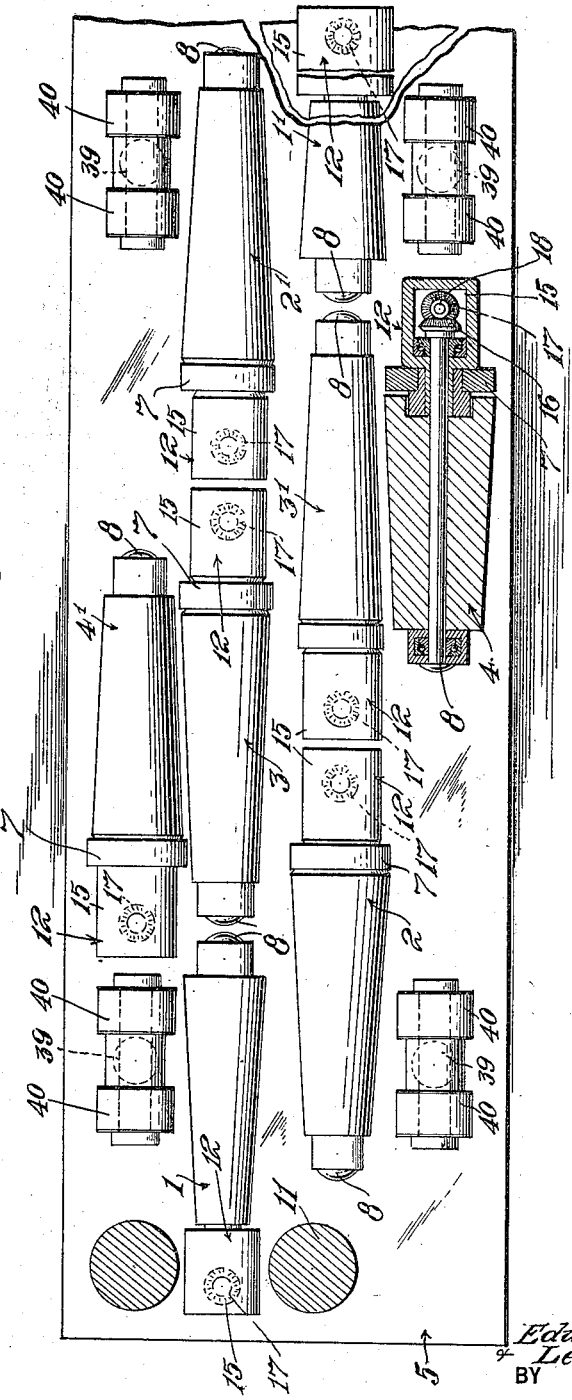

Patented July 8, 1924.

1,500,447

UNITED STATES PATENT OFFICE.

EDWIN A. GODLEY AND LEO J. GRUBMAN, OF NEW YORK, N. Y.

MEANS FOR MEASURING LUMBER.

Application filed September 23, 1921. Serial No. 502,620.

*To all whom it may concern:*

Be it known that we, EDWIN A. GODLEY, a citizen of the United States, and a resident of New York city, borough of Manhattan, county and State of New York, and LEO J. GRUBMAN, a citizen of the United States, and resident of New York city, borough of Manhattan, county and State of New York, have invented certain new and useful Improvements in Means for Measuring Lumber, of which the following is a specification.

This invention relates to an improved method and means for measuring lumber and generically considered, comprehends the provision of a novel method and mechanism whereby the input and output of boards as they are fed through a planing machine may be accurately measured in terms of square feet or surface measurement, as well as board feet or cubic measure.

It is the primary object and purpose of the present invention to provide means which is entirely automatic in its action irrespective of the width or thickness of the boards, eliminates the necessity of checking up after the planing operation and prevents waste.

It is another object of our invention to provide means whereby the combined surface and cubic measurements of two boards of relatively different widths and thicknesses may be accurately determined as the boards are simultaneously fed through the planer.

In one practical embodiment of the invention, the improved mechanism consists in an arrangement of tapering rollers for contact upon opposite longitudinal edges of a board passed beneath said rollers. Boards of different widths will contact at different points with the peripheral surface of the rollers relative to the ends thereof so that the speed of rotation of the rollers will vary in accordance with the point of contact and also the speed of rotation of the rollers relative to each other will vary. These rollers are operatively connected through suitable gearing to an odometer or other type of integrator and the different rotating speeds of the rollers for each lineal foot of relative movement of the board and the rollers are properly compensated so that the odometer will be properly actuated to accurately indicate the surface area of the board. We also provide a second odometer and mechanism automatically controlled by the board for actuating the latter odometer to indicate or record the board feet or cubic measurements of the board.

It is a further object of the invention to provide a mechanism for measuring lumber as above characterized, which is relatively simple in its construction, positive and reliable in operation, and which may be produced at comparatively small cost.

With the above and other objects in view, the invention consists in the improved means for measuring lumber as will be hereinafter more fully described, illustrated in the accompanying drawings and subsequently incorporated in the subjoined claims.

In the drawings wherein we have illustrated one practical and satisfactory embodiment of the invention and in which similar reference characters designate corresponding parts throughout the several views:

Figure 1 is a diagrammatic plan view illustrating one arrangement of the measuring rollers as contemplated in carrying out the present method;

Figure 2 is a diagrammatic side elevation;

Figure 3 is a detail elevation of a pair of the measuring rollers showing a slightly modified form thereof;

Figure 4 is an elevation of one of the rollers shown in Figure 3;

Figure 5 is a sectional view taken on the line 5—5 of Figure 4;

Figure 6 is a vertical sectional view through the frame of the measuring instrument;

Figure 7 is a plan view illustrating the arrangement of the mechanism for transmitting the movements of the rollers to the odometers;

Figure 8 is a sectional view taken on the line 8—8 of Figure 6;

Figure 9 is a similar section showing the means for initially adjusting the position of the rollers above the planer bed for boards of different thicknesses;

Figure 10 is a horizontal section taken on the line 10—10 of Figure 6, certain parts being shown in dotted lines and others omitted;

Figure 11 is a vertical transverse section taken on the line 11—11 of Figure 10;

Figure 12 is a sectional view taken on the line 12—12 of Figure 11;

Figure 13 is a detail elevation of a pair of the measuring rollers and illustrating diagrammatically the means for compensating the rotative movements of said rollers to each other, and Figure 14 is a bottom plan view, one roller being shown in section.

Referring more particularly to Figures 1, 2 and 3 of the drawings, the bed 5 of the planing machine is provided at its opposite edges with the usual longitudinally extending flanges 6. Over this bed plate the boards are fed to the planer and the rough surfaces thereof removed. Heretofore it has not been possible to keep an accurate check on the quantity of lumber put through the planer nor for the output of dressed lumber. Measurement by rule, as heretofore used, is quite inaccurate and consumes considerable time. We have, therefore, devised a method and means for measuring the lumber automatically as it is fed over the planer bed or other machine. To this end, we provide a series of roller sections and in the illustrated embodiment of the invention we have shown two such series of roller sections for simultaneously measuring two boards which may greatly differ in width. Thus the roller sections 1, 2, 3, and 4 in Figure 1 of the drawings are adapted to cooperate with one board while the roller sections 1', 2', 3', 4' cooperate with the second board. The roller sections 2, 3, 4 and 2', 3', 4', if arranged in coinciding axial relation in the order stated, would form two continuous tapering rollers. In the arrangement shown, the sections 1, 3 and 1', 3' of the respective series have their axes aligned while the other roller sections of each series are out of alignment and disposed in staggered relation to the first named sections. It will be understood that the boards B are not accurately positioned with respect to the side edges 6 of the planer bed but may be disposed at various distances from the edges of the bed. As will be seen from reference to Figures 1 and 3, the axes of the roller sections 1 and 1' are arranged at an inclination with respect to the axes of the remaining roller sections in each series, the latter sections having their axes disposed in substantially parallel relation to the surface of the planer bed.

In Figure 1 of the drawings we have shown one board engaged at one of its edges with one of the side flanges 6 of the planer bed and of sufficient width to extend beyond the center of the bed, and a second relatively narrow board upon the left hand side of the planer bed and in spaced relation to the edge thereof. This latter board, it will be noted, is in contact at its opposite longitudinal edges with the surfaces of the roller sections 1 and 2. Assuming that this board is twelve inches wide, it will be observed that the surface speed of rotation of the tapered roller sections will vary as the board is moved beneath said rollers in accordance with the point of contact of the edge of the board with the periphery of the roller section in relation to the ends of said roller section. Thus, in Figure 3, assuming that the roller 1 is of such diameter at its point of contact with the left hand edge of the board that there will be four revolutions of said roller section in one lineal foot of movement of the board over the planer bed and that the roller section 2 is of such diameter that the point of contact at the right hand edge of the board with said roller section that there will be three revolutions of the latter roller section. The difference between the peripheral movements of the roller sections is, therefore, one revolution which is the equivalent of one lineal foot of movement of the board. If the board is arranged upon the planer bed at any point between the ends of the rollers and in contact with their peripheral surfaces, this same relative difference in the speed of rotation of the roller sections occurs. The other wider board passing over the planer bed is in contact at its right hand edge with the small end of the roller section 1' while at its left hand edge this board is in contact with the large end of the roller section 4'. Each of the roller sections 2, 3, 4 and 2', 3', 4' at the larger end thereof has a wheel 7 loosely mounted upon its shaft or axis 8, and this wheel is of larger diameter than the maximum diameter of the roller section. Therefore, it will be seen that the roller sections 2' and 3' are supported by the wheel 7 out of contact with the surface of the board. The shafts of these rollers are connected by gearing to be presently described, to the shafts of the roller sections 1' and 4'. The roller sections 2' and 3' are thereby rotated at the same speed as the speed of rotation of the roller section 4'. The roller sections 1, 2, 3 and 4 are operatively geared together in a similar manner, but as the wheels 7 of the sections 3 and 4 are in contact with the surface of the wider board, it will also be apparent that these roller sections are operated from the roller section 2 independently of the operation of the roller sections in the other series.

It will be apparent from the foregoing that if the board was always placed upon the surface of the planer bed against one of the side flanges 6, a single tapering roller to contact with one edge of said board would suffice, but as these boards are placed upon the planer bed without regard to their positions with respect to each other or with relation to the bed of the planer, it is necessary to divide the roller into sections and so arrange said roller sections that they will contact with the opposite edges of each board in the manner above described. However, it is not essential except where extreme accuracy is desirable that the peripheral faces of each roller section shall have a continuous taper. Thus, as shown in Figure 3, the surface of each roller section might be divided up into a multiplicity of steps of varying diameters. Each of these steps 9 on the surface of the roller section is indicative of a difference of one inch in the width of the board. It will, therefore, be apparent that with this form of the roller sections fractional parts of an inch would not be measured.

We have also devised a relatively simple mechanism for transmitting the rotation of the roller sections to odometers or other integrator instruments in such a manner as to record upon said instruments the surface areas of the boards and also the number of board or cubic feet fed to the planer. Referring now to Figures 6, 8 and 9 of the drawings, 10 indicates a casing or housing which is vertically movable upon standards 11 suitably fixed in the opposite edges of the bed plate 5. Each of the roller sections above referred to has its shaft journaled at its ends in a bearing 12. This bearing is provided on each end with an upwardly extending post 13 which is vertically movable in a boss 14 formed on the bottom plate of the housing 10. One end of each bearing is further provided with a boxing or casing 15 into which one end of the roller shaft 8 extends, said end of the roller shaft having a beveled pinion 16 meshing with a similar pinion 17, Figure 14, on the lower end of a vertical shaft 18 extending upwardly through the post 13, Figure 6. The upper end of this shaft is engaged in an arm of a bearing casting 19 within the housing 10 and secured to the base wall thereof. Upon the upper end of said shaft a spiral gear 20 is keyed and meshes with a corresponding gear 21 on one end of the shaft 22 mounted in the bearing casting. The opposite end of this shaft is geared in a similar manner to the shaft of another roller section in the same series.

Upon reference to Figure 2, it will be seen that the roller sections 1, 2 or 1', 4' are rotated in the same direction. In order to transmit the difference between the rotative speeds of these roller sections to the odometer whereby the surface area of the board will be accurately indicated there is interposed in the shaft connection 22 between the roller sections 1 and 2 and 1', 2', a compensating gear generally indicated at 23 which may be of the planetary or other preferred type. The two sections of the shaft 22 are rotated in opposite directions by the gearing connecting said shaft sections to the relatively opposite ends of the roller sections. The frame 24 of the compensating gear is thus rotated in the same direction as the direction of rotation of the high speed section of said shaft but at a speed equal to half the difference in the rotative speeds of the two shaft sections. To this gear frame a spiral gear 25 is rigidly fixed and meshes with a similar gear 26 fixed upon a vertically disposed shaft mounted in a pedestal or standard 27. Upon the upper end of this shaft a horizontal disc 28 is secured, said disc having a hub provided with a beveled gear 29 which meshes with a beveled pinion 30 on the horizontal shaft 31. The roller sections 1', 2' are geared in a similar manner to a second horizontal shaft 32 which is in axial alignment with the shaft 31.

The odometer 33 records the combined surface areas of the two boards and the shaft of the odometer is provided with a pinion 34 which meshes with a gear 35 fixed to the frame or yoke 36 of the planetary or epicycle gearing 37. The shafts 31 and 32 rotate independently of the yoke 36 and are each provided with a beveled gear 31' and 32' respectively which mesh with the opposed beveled gears 38 mounted in the yoke. It will be understood that the shafts 31 and 32 rotate in the same direction but at relatively different speeds. Through the medium of the gearing just described, the frame or yoke 36 transmits rotation to the odometer shaft so that the odometer mechanism is actuated and the several digit wheels thereof caused to indicate the surface measurement of the two boards as determined by the relative speeds of rotation of the shafts 31 and 32.

In addition to the mechanism just described for ascertaining the surface area of the boards, we also provide means whereby the board feet or cubic measurement of the boards fed to the planer may be determined. To this end rods 39 are keyed in the bottom of the housing or casing 10 for free vertical movement and upon the lower ends of each of said rods a pair of rollers 40 is mounted and adapted for contact upon the upper surfaces of the respective boards. The mechanism which we shall now describe being duplicated on each side of the machine, a detail description of one of these mechanisms will suffice for both.

To the rod 39 an arm 41 is fixed and a vertical shaft 42 is secured at its lower end in said arm, said shaft extending through an opening provided in a second horizontal arm 43 fixed to one of the standards 11. The shaft 42 has a long spiral groove 44 therein in which a pin projecting radially into the opening of the arm 43 is engaged. Upon the upper end of said shaft a wide cog gear 45 is secured and meshes with the teeth of a rackbar 46 which is horizontally movable in suitable guides 47. Upon this rack a shaft 48 is rotatably mounted, said rack, however, having free rectilinear movement relative to the shaft. A friction pinion 49 is keyed upon said shaft and has frictional contact with the surface of the disc 28 so that in the rotation of the disc rotation will be transmitted to the shaft 48 through the pinion 49.

The two shafts 48 are operatively connected through the planetary or epicycle gearing 50 to a second odometer 51 in a similar manner to the connections of the shafts 31, 32 with the odometer 33.

When the board is inserted beneath the measuring rolls upon the surface of the planer bed it will engage the rollers 40 and move the rods 39 upwardly, thus through the medium of the shafts 42 rotating the cog gears 45 and shifting the racks 46 to position the friction pinions 49 upon the respective discs 28 with relation to the axis of rotation of said discs. Thus if the board is one and one-quarter inches thick the pinion 49 will be further from the center of the disc than if the board is only one inch thick and the shaft 48 will accordingly be rotated at relatively higher speed. In this manner, by determining the proper ratio for the several gear elements, the surface area of the boards is multiplied by the thickness of the respective boards and the proper movement transmitted to the digit wheels of the odometer 51 whereby the board feet or combined cubic measurements of the two boards will be accurately recorded.

In initially setting the machine for operation the entire housing or casing 10 with the mechanism contained therein is vertically adjusted upon the standards 11. One of the standards is graduated as shown at 52 in Figure 8 and the upper ends of the corresponding standards at opposite sides of the machine are threaded as at 53. Upon this threaded portion of each standard a nut 54, rotatably mounted in the wall of the casing, is engaged. Upon the lower end of each nut a worm gear 55 is fixed. A horizontal shaft 56 is journaled at its opposite end in suitable bearings on the casing walls and is provided with worms 57 which mesh with the respective worm gears 55. One end of the shaft 56 has a suitable operating handle 58 attached thereto. By operating the shaft 56, the housing or casing with the mechanism therein may be raised or lowered to properly position the measuring rollers for various thicknesses of boards as indicated by the scale 52. When the boards are inserted under the rollers, therefore, the rollers with their bearings 12 are lifted relative to the casing or housing 10 so that the entire weight of the roller sections and the bearings therefor is imposed upon the board thus insuring a firm frictional engagement of the rollers with the surface of the board.

The mechanism which we have above described for transmitting the rotation of the roller sections and converting such rotation into terms of surface or cubic measurements is largely suggestive, and in practice it may be found desirable to adopt numerous changes in the arrangement and mounting of the transmission gearing. One of the important features resides in the arrangement of the roller sections or their equivalent for contact with the boards so that wide and narrow boards can be simultaneously fed to the planer and accurately measured. The wider of the two boards may be arranged at either side of the planer bed with its inner portion extending beyond the center of the bed. In any case the respective boards will operatively engage with only the roller sections in one series since the rollers of the other series will be supported out of contact with that board by the wheel 7.

From the foregoing description considered in connection with the accompanying drawings, our improved apparatus which we have disclosed in a preferred embodiment thereof, will be readily understood. It will be seen that we have devised a means whereby the surface or cubic measurements of both narrow and wide boards may be automatically registered during the feeding of the boards to the planer with absolute accuracy.

Assuming that when the board is fed to the planer, it is one and one-eighth inch in thickness and in the planing operation an eighth of an inch is removed from the surface of the board, the surface and cubic measurements of the board will be registered on the respective odometers before the board is planed. The output of dressed lumber may be readily determined by multiplying the square surface measurement of the board as recorded by the odometer 33 by the final thickness of the board. Thus, by means of our invention both the input and output of the planer can be accurately determined. In so far as we are aware, it has never before been attempted to automatically measure one or more boards as they are fed simultaneously to a machine. It will be seen that the fundamental principle of our present invention involves the idea of contacting a rotatable element with the edge of the board and converting such rotative movement into terms of measurement registered upon the integrator to indicate the surface area or the board feet in the particular board which is fed to the machine.

We have herein referred to a preferred arrangement of the several roller sections by means of which the measurement of the board is primarily effected. It is to be understood, however, that such arrangement may also be susceptible of certain changes or modifications and we do not, therefore, desire to be limited to the precise relative arrangement of the roller sections as shown in the drawings. Likewise the computing mechanism and the connections between the same and the roller sections might also be produced in other alternative structures and we accordingly reserve the privilege of resorting to all such legitimate changes as may be fairly embodied within the spirit and scope of the invention as claimed.

We claim:

1. In an apparatus for measuring lumber, a rotary member having parts of relatively different diameters adapted to be directly engaged by a board disposed in a plane parallel to the axis of rotation of said member whereby said member is rotated at a speed governed by the width of the board, an integrator, and means operatively connecting said member to the integrator to register the surface area of the board upon said integrator.

2. In an apparatus for measuring lumber of unknown length and width, an integrator, and means for simultaneously registering upon said integrator the combined surface measurements of a plurality of boards, said means including members each engaging one edge of a board and adapted to be actuated in the relative movement of said members and the boards, and mechanism operatively connecting said members to the integrator to transfer movement to the latter in terms indicative of the combined surface measurements of the boards.

3. In an apparatus for measuring lumber of unknown length and width, an integrator, separate means each adapted for contact with a board to be actuated thereby in the relative movement of the board and said means, and mechanism operatively connecting each of said means to the integrator to transfer movement to the latter in terms indicative of the board foot measurements of the board.

4. In an apparatus for measuring lumber of unknown length and width, an integrator, and means for simultaneously registering upon said integrator the combined board foot measurements of a plurality of boards, said means including members each adapted for engagement by a board to be actuated thereby in the relative movement of said member and the board, and mechanism operatively connecting said members to the integrator to transfer movement to the latter in terms indicative of the combined board foot measurements of the boards.

5. In an apparatus for measuring lumber of unknown length and width, a rotatably mounted member operatively arranged in a fixed position and adapted to engage an edge of a board positioned in a plane parallel to the axis of said member whereby said member will be rotated in the linear movement of the board, an integrator, and mechanism operatively connecting said member to the integrator to transfer the rotative movement of said member to the integrator in terms indicative of the surface measurement of the board.

6. In an apparatus for measuring lumber of unknown length and width, a rotatably mounted member operatively arranged in a fixed position for contact with a board to be actuated thereby in the linear movement of the board, two integrators, and mechanism operatively connecting the said member to the integrators and including means controlled by the board whereby the movement of said member is transferred to one of the integrators in terms indicative of the board foot measurement of the board, while movement is simultaneously transferred to the other integrator in terms indicative of the surface measurement of the board.

7. In an apparatus for measuring lumber of unknown length and width, tapered rollers adapted for contact upon opposite edges of the board to be rotated thereby in the relative movement of the board and rollers, an integrator, and mechanism operatively connecting said rollers to the integrator to transfer rotary movement to the latter in terms indicative of the surface measurement of the board.

8. In an apparatus for simultaneously measuring two or more boards of unknown length and width, tapered rollers adapted for engagement upon the opposite edges of each board to be rotated thereby in the relative movement of the boards and the rollers, an integrator, and mechanism operatively connecting said rollers to the integrator to transfer rotary movement to the latter in terms indicative of the combined surface measurements of the boards.

9. In an apparatus for measuring lumber of unknown length and width, a tapered roller adapted for contact with one longitudinal edge of boards of various widths to be rotated thereby in the relative movement of the board and the roller, an integrator, and means for transferring the rotative movement of the roller to the integrator in terms of the square foot measurement of the board.

10. In an apparatus for measuring lumber, independently operating means each adapted for contact at the same time with a separate board to be actuated thereby in the relative movement of the boards and said means, an integrator, and means for simultaneously transferring movement from both of said means to the integrator in terms indicative of the combined surface measurements of said boards.

11. In an apparatus for measuring lumber, independently operating means having a fixed operating position adapted for contact with boards of various widths to be rotated in the relative movement of the boards and said means, an integrator and means for transferring movement from said means to the integrator in terms indicative of the board foot measurement of the board.

12. In an apparatus for measuring lumper, a series of independently mounted rollers two of which are adapted for contact upon opposite edges of a board to be rotated thereby in the relative movement of the board and rollers, means for compensating the differences in the rotative speeds of the rollers engaged upon the edges of the board, an integrator, and means for transferring the movements of said compensating means to the integrator in terms indicative of the surface measurement of the board.

13. In an apparatus for measuring lumber, two series of rollers, the rollers in each series arranged in spaced relation and adapted for cooperation with boards of various widths, two rollers in each series adapted for engagement respectively upon opposite edges of a board to be rotated thereby in the relative movement of the boards and the rollers, means for compensating the differences in the speeds of rotation of the rollers in each series, an integrator, and means for transferring the movements of said compensating means to the integrator in terms indicative of the combined surface measurements of the boards.

14. In an apparatus for measuring lumber, two series of rollers, the rollers in each series arranged in spaced relation and adapted for cooperation with boards of various widths, two rollers in each series adapted for engagement respectively upon opposite edges of the board to be rotated thereby in the relative movement of the boards and the rollers, means for compensating the differences in the speeds of rotation of the rollers in each series, two integrators, means for transferring the movements of said compensating means to one of the integrators in terms indicative of the combined surface measurements of said boards and additional means associated with said last named means for actuating the other integrator to indicate thereon the combined board feet measurements of the boards.

15. In an apparatus for measuring lumber, a roller adapted for engagement with a board to be rotated thereby in the relative movement of the board and the roller, an integrator, means for transferring the roller movement to the integrator in terms indicative of the surface area of the board, a second integrator, operating means therefor associated with said transferring means and actuated thereby, and means actuated by the board for controlling the operation of said second named integrator to indicate thereon the board feet measurement of the board.

16. In an apparatus for measuring lumber, a roller adapted for engagement with the board to be rotated thereby in the relative movement of the board and roller, an integrator, means for transferring the roller movement to said integrator in terms indicative of the surface area of the board, a second integrator, means for operating the second integrator geared to said transferring means and including a shiftable gear element, and means actuated by the board for shifting said gear element to control the operation of the second integrator and indicate thereon the board feet measurement of the board.

17. In an apparatus for measuring lumber, a pair of longitudinally tapered rollers adapted for engagement respectively upon opposite edges of a board to be rotated thereby in the relative movement of the board and rollers, means for compensating the difference in the speeds of rotation of the two rollers, an integrator, and means for transferring the movements of said compensating means to the integrator in terms indicative of the surface area of the board.

18. In an apparatus for measuring lumber, a pair of longitudinally tapered rollers adapted for engagement respectively upon opposite edges of a board to be rotated thereby in the relative movement of the board and rollers, means for compensating the difference in the speeds of rotation of the two rollers, an integrator, means for transferring the movements of said compensating means to said integrator in terms indicative of the surface area of the board, a second integrator, means operatively associated with said transferring means for actuating the second integrator, and means automatically controlled by the board in accordance with the thickness thereof and governing the operation of the actuating means for said second integrator to indicate thereon the board feet measurement of the board.

In testimony that we claim the foregoing as our invention we have signed our names hereunder.

EDWIN A. GODLEY.
LEO J. GRUBMAN.